(12) United States Patent
Besenbeck et al.

(10) Patent No.: US 8,615,885 B2
(45) Date of Patent: Dec. 31, 2013

(54) METHOD FOR PRODUCING THE ROLLING ELEMENTS OF A BALL ROLLER BEARING

(75) Inventors: Kurt Besenbeck, Herzogenaurach (DE); Horst Doeppling, Herzogenaurach (DE); Heinrich Hofmann, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 218 days.

(21) Appl. No.: 13/132,692

(22) PCT Filed: Dec. 8, 2009

(86) PCT No.: PCT/EP2009/066591
§ 371 (c)(1),
(2), (4) Date: Jun. 3, 2011

(87) PCT Pub. No.: WO2010/069817
PCT Pub. Date: Jun. 24, 2010

(65) Prior Publication Data
US 2011/0232094 A1    Sep. 29, 2011

(30) Foreign Application Priority Data

Dec. 19, 2008 (DE) .......................... 10 2008 064 154
Feb. 17, 2009 (DE) .......................... 10 2009 009 254

(51) Int. Cl.
*B21K 1/02* (2006.01)
*B24B 1/00* (2006.01)
*B24B 7/10* (2006.01)

(52) U.S. Cl.
USPC .......... 29/898.069; 29/898; 384/568; 451/49; 451/177

(58) Field of Classification Search
USPC ........ 29/898.069, 899; 384/568; 451/49, 177, 451/209
See application file for complete search history.

(56) References Cited

U.S. PATENT DOCUMENTS 665,905 A * 1/1901 Hill ........................... 29/898.069
1,701,736 A * 2/1929 Timken .................... 29/898.068
(Continued)

FOREIGN PATENT DOCUMENTS

DE       311 317 C    3/1919
DE       56 430 A     6/1967
(Continued)

OTHER PUBLICATIONS

AFBMA Ball Grades Listed on Bal-Tec Website, www.precisionballs.com/afbma_ball_grade.htm, printed on Jul. 23, 2013.

(Continued)

*Primary Examiner* — Alexander P Taousakis
(74) *Attorney, Agent, or Firm* — Lucas & Mercanti, LLP

(57) ABSTRACT

A method for producing, ball rollers. The following method steps are performed to produce the ball rollers: (A) cutting unfinished sections at a defined length from a round wire that has a defined diameter, (B) compression molding ball roller blanks that have end face depressions in the form of a die tool, and (C) grinding the ball roller blanks to the desired final dimensions in a ball grinding machine. The cut-off unfinished sections have a volume by which during compression molding an approximately tangential raceway transition from one ball roller half to the other ball roller half and material fibers extending under the running surfaces of the ball rollers parallel or approximately parallel to the running surfaces arise. In addition, the ball roller blanks are ground to the final dimensions in a horizontal ball grinding machine loaded exclusively with ball roller blanks of the same size.

7 Claims, 4 Drawing Sheets

(56) References Cited

U.S. PATENT DOCUMENTS

| | | | | |
|---|---|---|---|---|
| 1,784,463 | A | * | 12/1930 | Nice .................. 29/898.068 |
| 2,313,876 | A | * | 3/1943 | Jelinek ............... 29/898.069 |
| 2,614,317 | A | | 10/1952 | Deussen |
| 3,206,828 | A | * | 9/1965 | Kikuchi .................... 29/899 |
| 3,984,945 | A | | 10/1976 | Messerschmidt |
| 5,443,317 | A | * | 8/1995 | Momono et al. ........... 384/491 |
| 5,950,469 | A | * | 9/1999 | Tsuro et al. ................. 72/53 |
| 6,745,472 | B2 | * | 6/2004 | Fujita et al. .............. 29/899 |
| 7,146,734 | B2 | * | 12/2006 | Murai et al. ........... 29/898.069 |
| 2002/0141677 | A1 | * | 10/2002 | Murai et al. ............. 384/568 |
| 2006/0230856 | A1 | * | 10/2006 | Okita et al. ............. 74/424.88 |
| 2010/0296764 | A1 | * | 11/2010 | Strandell et al. .......... 384/625 |

FOREIGN PATENT DOCUMENTS

| | | |
|---|---|---|
| DE | 43 34 195 A1 | 3/1994 |
| DE | 43 36 441 A1 | 4/1995 |
| DE | 10 2005 014 556 A1 | 10/2006 |
| DE | 102 10 670 B4 | 10/2006 |
| EP | 1 270 142 A2 | 1/2003 |
| JP | 2001 259981 A | 9/2001 |
| WO | 96 33047 A1 | 10/1996 |

OTHER PUBLICATIONS

Ball Specifications Listed on gmsball.co.uk/specs.html, Printed on Jul. 23, 2013.

* cited by examiner

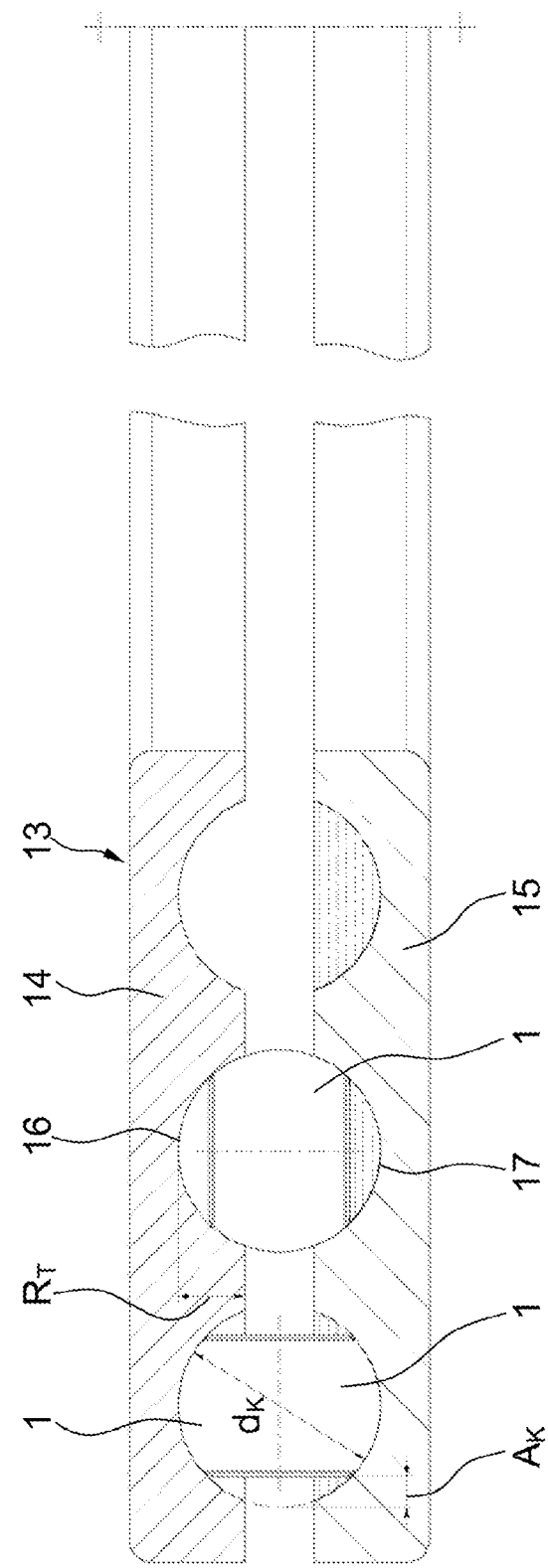

METHOD FOR PRODUCING THE ROLLING ELEMENTS OF A BALL ROLLER BEARING

This application is a 371 of PCT/DE2009/066591 filed Dec. 8, 2009, which in turn claims the priority of DE 10 2008 064 154.5 filed Dec. 19, 2008 and DE 10 2009 009 254.4 filed Feb. 17, 2009, the priority of these applications is hereby claimed and these applications are incorporated by reference herein.

FIELD OF THE INVENTION

The invention relates to a method for producing the rolling elements of a ball roller hearing, the rolling elements of which are designed as ball rollers.

BACKGROUND OF THE INVENTION

Ball roller bearings are rolling bearings with special rolling elements which are designed as ball rollers and which, starting from a basic spherical shape, have in each case two side faces which are flattened from this basic spherical shape and are arranged parallel to one another and between which the running surfaces of the ball rollers are in each case arranged. Ball roller bearings of this type have long been known in various embodiments, for example, from DE 311 317 A or DE 42 34 195 A1 and are distinguished, above all, in that, by virtue of the special design of their rolling elements, as compared with ball bearings of identical type, either they can be filled with a larger number of rolling elements and thereby have a higher load-bearing capacity (upgrading) or can he designed with the same load-bearing capacity and at the same time require a substantially smaller radial construction space (downsizing). Another advantage of such ball roller bearings is that, by virtue of their rolling element shape, either they can be designed to be substantially narrower axially than comparable ball bearings and thereby contribute to a saving of axial installation space or they can be designed axially with the same width as comparable ball bearings and consequently have a substantially larger lubricant reservoir and a longer service life.

Furthermore, it is known from DE 10 2005 014 556 A1, in such ball roller hearings, to design the width of the ball rollers between their side faces with about 70% of the diameter of their basic spherical shape, since the ball rollers thereby have a contact face with their raceways in the bearing rings, such as the balls of conventional grooved ball bearings also have with their raceways. Moreover, in practice, such a width has proved to be an optimum in terms of the radial and axial load-bearing capacity of the ball roller bearing and makes it possible that a large number of ball rollers can be introduced into the ball roller bearing by the eccentric or axial mounting method.

Furthermore, DE 102 10 670 B4 has disclosed a method for producing the rolling elements of a ball roller bearing, the rolling elements of which are designed as ball rollers which additionally have on their side faces in each case a circular end trough as a lubricant reservoir. According to this method, the ball rollers are produced in that, first, a multiplicity of blank segments are cut off in a defined length from a round wire of defined diameter and are then converted by compression molding in the form of a closed die into ball roller blanks having end troughs. Since, during this compression molding, because of an excess of volume of the blank segments in relation to the shape of the die, a saturn ring, as it is known, occurs at the raceway transition from one ball roller half to the other ball roller half, this saturn ring is removed in a fourth method step with the aid of a separate tool after the ball rollers have been ejected from the closed die. Finally, the grinding of the ball roller blanks to the desired final dimensions is carried out in a vertical ball grinding machine which is designed with a vertically arranged fixed grinding wheel and with a rotating grinding wheel arranged parallel to the latter and in both grinding wheels has, in each case opposite one another, an identical number of grinding grooves arranged coaxially to one another. In a continuous rotary process, the running surfaces of the ball rollers are ground circularly between these grinding wheels, while, in order to increase accuracy, grinding is carried out together with conventional bearing balls of identical size which have previously been intermixed in a preferred ratio of size and which have previously been intermixed in a preferred ratio of 25% ball rollers to 75% bearing balls.

In such a production method, however, it has proved to be a disadvantage that, during the compression molding of the ball roller blanks, said saturn ring occurs at the raceway transition from one ball roller half to the other ball roller half and first has to be removed again in a complicated way with the aid of a separate tool and therefore needlessly increases the production costs for the ball rollers on account of further necessary manufacturing steps and additional tool costs. Furthermore, the occurrence of such a saturn ring also has the disadvantage that all the material fibers underneath its surface are also aligned with its course, and therefore, after the removal of the saturn ring, a material fiber course occurs which is directed perpendicularly to the running surface of the ball rollers and has an adverse effect on the component strength and loadability of the ball rollers.

Another disadvantage is that the grinding of the ball rollers to their final dimensions is carried out in a vertical ball grinding machine, with bearing balls of identical size being intermixed, since this may cause the ball rollers and bearing balls to fall one on the other within the grinding grooves in the grinding wheels as a result of gravity, this leading to impact damage to the ball rollers or their running surfaces which can no longer be rectified during grinding because intended final dimensions are to be maintained. At the same time, by the ball rollers being intermixed with bearing balls in a ratio of 25:75 per grinding process, only very small batch sizes can be produced which, in conjunction with process times of up to 150 hours per grinding operation, contribute to a further adverse rise in the production costs for the ball rollers.

OBJECT OF THE INVENTION

Proceeding from the exposed disadvantages of the solutions of the known prior art, the object on which the invention is based is, therefore, to conceive a method for producing the rolling elements of a ball roller bearing, by means of which, on the one hand, during the compression molding of the ball roller blanks the occurrence of saturn rings at the raceway transition from one ball roller half to the other ball roller half and the associated adverse material fiber course beneath the raceways of the ball rollers can be avoided and, on the other hand, during the grinding of the ball rollers, the falling of the ball rollers one on the other within the grinding grooves in the grinding wheels due to gravity and the associated impact damage to the running surfaces of the ball rollers can be ruled out, and which is distinguished overall by large batch sizes per grinding process and low production costs.

DESCRIPTION OF THE INVENTION

According to the invention, the object is achieved in that the cut-off blank segments have a volume, as a result of which, during their compression molding, on the one hand, an approximately tangential raceway transition from one ball roller half to the other ball roller half and, on the other hand, material fibers running beneath the running surfaces of the ball rollers parallel or approximately parallel to these running surfaces are obtained, and in that the grinding of the ball roller blanks to their final dimensions takes place in a horizontal ball grinding machine fed solely with ball roller blanks of identical size.

The invention is thus based on the recognition that, by the blank segments being cut to length exactly from the round wire used or on account of the accompanying accurate determination of volume of the blank segments, it is possible, during the compression molding of the ball roller blanks, to avoid effectively the occurrence of Saturn rings at the raceway transition from one ball roller half to the other ball roller half and, consequently, to provide, beneath the raceways of the ball rollers, a material fiber course which is advantageous for the component strength and loadability of the ball rollers and which is oriented parallel to their raceways. It was also recognized that, by the ball roller blanks being ground to their final dimensions in a horizontal ball grinding machine fed solely with ball roller blanks of identical size, it is possible effectively to rule out a fall of the ball rollers one on the other within the grinding grooves in the grinding wheels due to gravity and the associated impact damage to the ball rollers or their running surfaces, since this can no longer arise during horizontal grinding. Moreover, since the grinding of the ball roller blanks takes place solely with ball roller blanks of identical size, large batch sizes per grinding process and, overall, low production costs can also be achieved.

Preferred refinements and developments of the methods designed according to the invention are described in the sub-claims.

Thus, in the method according to the invention there is provision whereby the blank segments are cut off from a round wire coil which is composed of continuous casting wire made from 100 Cr 6. This type of steel is usually also used in the production of bearing balls or other rolling elements and is distinguished, above all, by good formability, good hardness properties and also high strength and elasticity.

A further feature of the method according to the invention is that, after the blank segments have been cut off from the round wire, washing of the blank segments in order to eliminate impurities occurring during cutting and pressing takes place. However, this method step is optional, that is to say it increases the quality of the production process, but is not absolutely necessary.

Furthermore, as claimed in claim 4, the method according to the invention is also distinguished in that, after the compression molding of the ball roller blanks, further washing of the ball roller blanks is also carried out, in order, here too, to eliminate again the impurities which have occurred during compressing molding. Subsequently, the ball roller blanks are introduced for a first time into the horizontal ball grinding machine and, in the still heat-untreated, that is to say soft state, are ground to an accuracy which is comparable to the accuracy of AFBMA Ball Grade G 30 in the case of bearing balls. This soft grinding is then followed by the heat treatment of the ball rollers which comprises in a known way full hardening, quenching and annealing at temperatures customary for bearing balls. The scaling which in this case occurs is then finally also eliminated by means of a drum-type or vibratory grinding process in which the ball rollers are circulated, together with stone grains and water, in a drum.

In yet a further provision, after the drum-type grinding of the ball rollers, strain hardening of the running surfaces of the ball rollers optionally also takes place by swirling in a drum. In this case, the ball rollers are likewise introduced into a drum and swirled together with one another, so that, by the ball rollers striking one another, a strain hardening of their running surfaces occurs.

Finally, in further detailing of the method according to the invention at claim 6, it is also proposed that the grinding of the ball rollers to their final dimensions is carried out in two substeps. For the first substep, the ball rollers are in this case introduced for a second time into a horizontal ball grinding machine and are prelapped with an accuracy which is comparable to the accuracy of AFBMA Ball Grade G 20 in the case of bearing balls, while, in a following second substep, the ball rollers are introduced into a further horizontal ball grinding machine in which the finish lapping of the ball rollers then takes place with an accuracy of AFBMA Ball Grade G 10 comparable to bearing balls. The horizontal ball grinding machine for carrying out the grinding processes described is in this case composed essentially of a horizontally arranged fixed grinding wheel and of a rotating grinding wheel arranged parallel to the latter, there being arranged in both grinding wheels, in each case opposite one another, an identical number of grinding grooves which are arranged coaxially to one another and between which the ball rollers are arranged chaotically to one another and their running surfaces are ground cylindrically. A particular feature of this horizontal ball grinding machine is that the grinding grooves in the grinding wheels have a groove depth which corresponds to 2 to 3 times the flattening of the ball rollers from the diameter of their basic spherical shape, in order thereby to ensure that the ball rollers are driven or moved forward between the grinding wheels in any of their possible positions. Moreover, the forward movement of the ball rollers is in this case also assisted by a liquid abrasive which at the same time causes cooling and cleaning of the grinding wheels of the ball rollers which are being processed.

Then, in conclusion, as the last method step, a final check of the ball rollers or sorting of the ball rollers according to various accuracy qualities is carried out, in that they are rolled over slotted raceways having collecting containers located beneath them.

BRIEF DESCRIPTION OF THE DRAWINGS

A preferred embodiment of the method according to the invention is explained in more detail below, with reference to the accompanying drawings in which:

FIG. 7 shows an enlarged sectional illustration of the grinding wheels of a horizontal ball roller grinding machine.

DETAILED DESCRIPTION OF THE DRAWINGS

Figure 1:
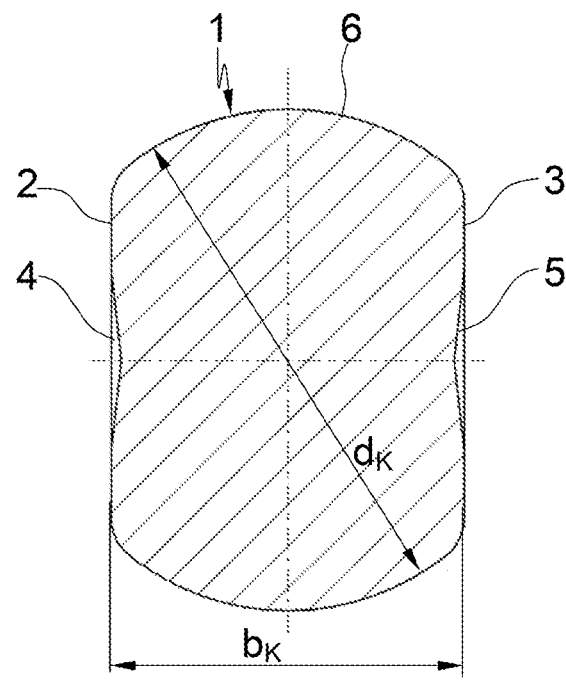
FIG. 1 shows an enlarged sectional view of a ball roller produced according to the invention.
Figure 2:
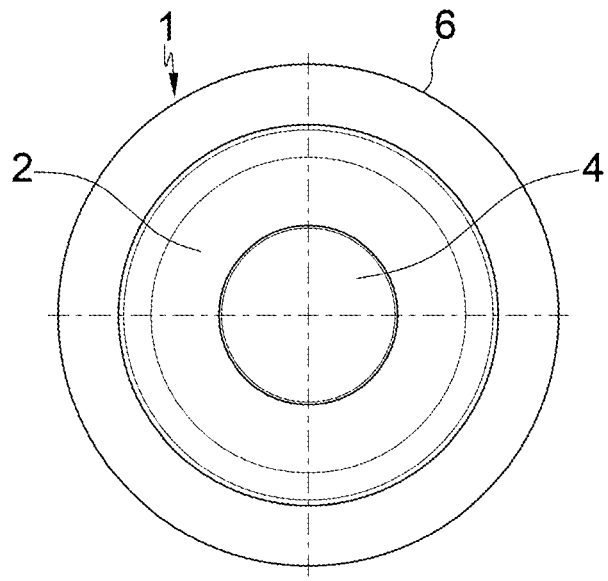
FIG. 2 shows an enlarged side view of a ball roller produced according to the invention.

FIGS. 1 and 2 show clearly a rolling element, designed as a ball roller 1, of a ball roller bearing, which rolling element has in each case, starting from a basic spherical shape, two side faces 2, 3 flattened from this basic spherical shape and arranged parallel to one another, and which is designed with circular end troughs 4, 5 in these side faces 2, 3. The running surface 6 of the ball roller 1 is arranged between these side faces 2, 3, as can be seen clearly, the width $b_K$ of the ball roller 1 between the side faces 2, 3 amounting to about 70% of the diameter $d_K$ of its basic spherical shape.

Figure 3:
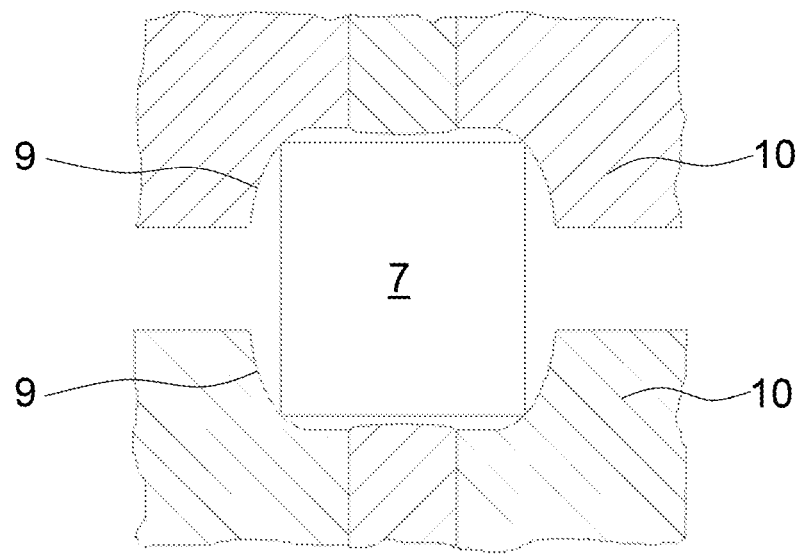
FIG. 3 shows a blank segment of a ball roller produced according to the invention, before compression molding.
Figure 4:
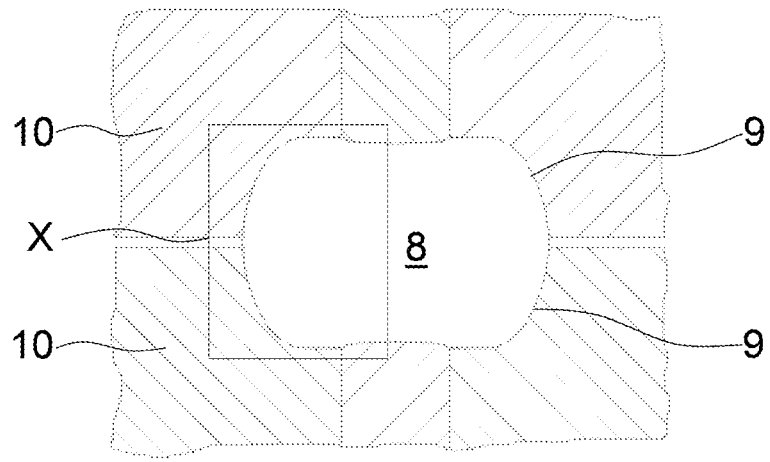
FIG. 4 shows a ball roller blank of a ball roller produced according to the invention, after compression molding.
Figure 5:
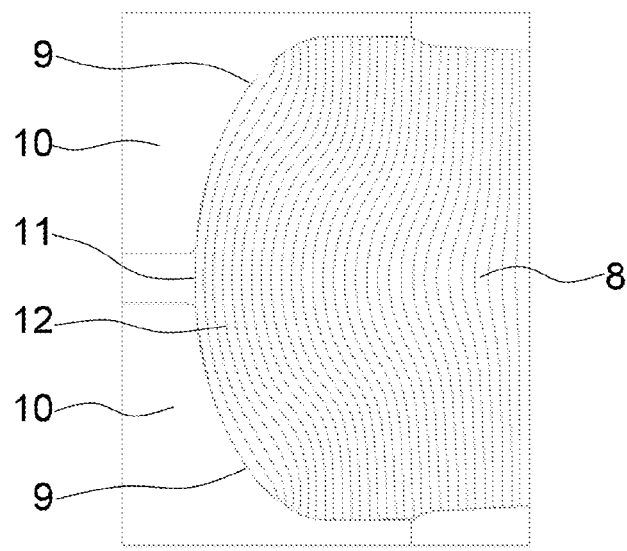
FIG. 5 shows an enlargement of the detail X on the ball roller blank according to the FIG. 4.
Figure 6:
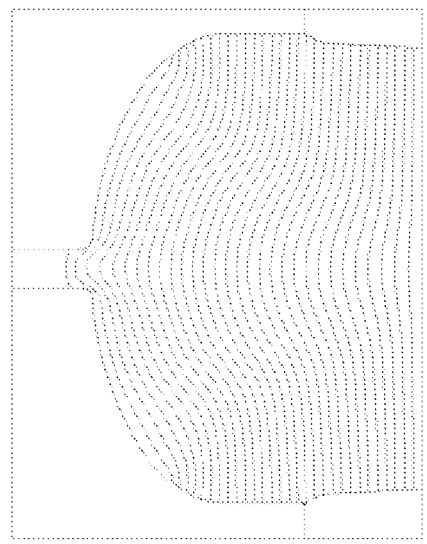
FIG. 6 shows an enlargement of the detail X according to FIG. 4 on a ball roller blank of the prior art.

The production of these ball rollers 1 is carried out, by the method according to the invention, in that, first, a multiplicity of blank segments 7 are cut off in a defined length from a round wire formed as continuous casting wire of quality 100 Cr 6 and having a defined diameter and are then washed in order to eliminate impurities occurring during cutting and pressing. Subsequently, as illustrated in FIGS. 3 and 4, the blank segments are converted by compression molding in the mold 9 of a closed die 10 into ball roller blanks 8 with end troughs 4, 5 and are washed a further time, in order, here too, to eliminate again the impurities which have occurred during compression molding. It becomes clear in this case from FIGS. 4 and 5 that the cut-off blank segments 7 have a volume, as a result of which, during their compression molding, in contrast to the ball rollers shown in FIG. 6 and produced by the method described in the prior art, an approximately tangential raceway transition 11 from one ball roller half to the other ball roller half is obtained and, at the same time, the material fibers 12 running beneath the running surfaces 6 of the ball rollers 1 are oriented parallel or approximately parallel to these running surfaces 6.

In a way not illustrated in any more detail, the ball roller blanks 8 are then introduced for a first time into a horizontal ball grinding machine 13 fed solely with ball roller blanks 8 of identical size and are ground in the still heat-untreated, that is to say soft state to an accuracy which is comparable to the accuracy of AFBMA Ball Grade G 30 in the case of bearing balls. This soft grinding is then followed by the heat treatment of the ball rollers 1 which comprises in a known way full hardening, quenching and annealing at temperatures customary for bearing balls. The scaling which in this case occurs is then also eliminated by means of a drum-type or vibratory grinding process, in which the ball rollers 1 are circulated, together with stone grains and water, in a drum.

Finally, in two substeps, the grinding of the ball roller blanks 8 to their final dimensions is then carried out in a horizontal ball grinding machine 13 likewise fed solely with ball roller blanks 8 of identical size. For the first substep, the ball rollers 1 are in this case introduced for a second time into a horizontal ball grinding machine 13 and prelapped with an accuracy which is comparable to the accuracy of AFBMA Ball Grade G 20 in the case of bearing balls, while, in a following second substep, the ball rollers are introduced into a further horizontal ball grinding machine 13 in which the finish lapping of the ball rollers 1 with an accuracy G 10 comparable to hearing balls takes place.

As can be seen in FIG. 7, the horizontal ball grinding machine 13 for carrying out the grinding processes described is in this case composed essentially of a horizontally arranged fixed grinding wheel 14 and of a rotating grinding wheel 15 arranged parallel to the latter, there being arranged in both grinding wheels 14, 15, in each case opposite one another, an identical number of grinding grooves 16 which are arranged coaxially to one another and between which the ball rollers 1 are arranged chaotically to one another and their running surfaces 6 are ground cylindrically. A particular feature of this horizontal ball grinding machine 13 is that the grinding grooves 16 in the grinding wheels 14, 15 have a groove depth $R_T$ which corresponds to 2 to 3 times the flattening $A_K$ of the ball rollers 1 from the diameter $d_K$ of their basic spherical shape, in order thereby to ensure that the ball rollers 1 are driven or moved forward between the grinding wheels 14, 15 in any of their possible positions. The forward movement of the ball rollers 1 is in this case also assisted, moreover, by a liquid abrasive which is indicated in FIG. 7 in the grinding grooves 16 and which at the same time causes cooling and cleaning of the grinding wheels 14, 15 and of the ball rollers 1 which are being processed.

Then, as the last method step, a final check of the ball rollers 1 or sorting of the ball rollers 1 according to various accuracy qualities also takes place, in that they are rolled over slotted raceways having collecting containers located beneath them.

List of Reference Numerals

1 Ball Roller
2 Side Face
3 Side Face
4 End Trough
5 End Trough
6 Running Surface
7 Blank Segment
8 Ball Roller Blank
9 Closed-Die Mold
10 Closed Die
11 Raceway Transition
12 Material Fibers
13 Horizontal Ball Grinding Machine
14 Grinding Wheel
15 Grinding Wheel
16 Grinding Grooves in 14
17 Grinding Grooves in 15
$b_K$ Width of 1
$d_K$ Diameter of 1
$R_T$ Groove Depth of 14, 15
$A_K$ Flattening of $d_K$

The invention claimed is:

1. A method for producing rolling elements of a ball roller bearing, the rolling elements are ball rollers which, starting from a basic spherical shape, have two flattenings forming side faces that are flattened from the basic spherical shape and are arranged parallel to one another and which have circular end troughs and between the end troughs, running surfaces of the ball rollers are arranged, and a width of the ball rollers between the end troughs amounts to about 70% of a diameter of the basic spherical shape, such that each flattening is about 15% of the diameter of the basic spherical shape, the method comprising the following steps:

(A) cutting blank segments in a defined length from a round wire of defined diameter;
(B) compression molding ball roller blanks with the end troughs in a mold of a closed die; and
(C) grinding the ball roller blanks in a horizontal ball grinding machine, which is fed solely with ball roller blanks of identical size, to a desired final dimension, the ball grinding machine having two grinding wheels arranged parallel to each other, the grinding wheels having opposing grooves, wherein the grooves each have a groove depth that is 2 to 3 times the flattening, thereby ensuring that the ball roller blanks are driven in any possible position, wherein the blank segments, which are cut, have a volume, and as a result of the volume, during the compression molding an approximately tangential raceway transition from one ball roller half to another ball roller half is formed and material fibers, which run beneath the running surfaces of the ball rollers, parallel or approximately parallel to the running surfaces, are obtained.

2. The method as claimed in claim 1, wherein the blank segments are cut from a round wire coil, which is composed of a continuous casting wire made from 100 Cr 6.

3. The method as claimed in claim 2, wherein, after method step (A), the method further comprising the step of: washing of the blank segments to eliminate impurities occurring during cutting and pressing.

4. The method as claimed in claim 1, wherein, after method step (B), the method further comprising the steps of: (I) washing of the ball roller blanks to eliminate impurities occurring during compression molding; (II) soft grinding the ball roller blanks to an accuracy corresponding to ball grade G 30; heat treating by full hardening, quenching and annealing the ball rollers;

and (IV) drum-type grinding or vibratory grinding of the heat-treated ball rollers to eliminate scaling.

5. The method as claimed in claim 4, wherein, after the drum-type grinding of the ball rollers, the method further comprising the step of strain hardening of the running surfaces of the ball rollers by swirling in a drum.

6. The method as claimed in claim 1, wherein after method step (C), the method further comprising the steps of: (I) prelapping the ball rollers to an accuracy corresponding to ball grade G 20; and (II) finish lapping the ball rollers to an accuracy corresponding to ball grade G 10.

7. The method as claimed in claim 5, wherein, after method step (C), the method further comprising the steps of: a final checking of the ball rollers or sorting of the ball rollers.

* * * * *

UNITED STATES PATENT AND TRADEMARK OFFICE
CERTIFICATE OF CORRECTION

PATENT NO.        : 8,615,885 B2                                           Page 1 of 1
APPLICATION NO. : 13/132692
DATED             : December 31, 2013
INVENTOR(S)       : Besenbeck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this
Twenty-second Day of September, 2015

Michelle K. Lee
*Director of the United States Patent and Trademark Office*